United States Patent
Leibbrandt et al.

(10) Patent No.: US 7,631,740 B2
(45) Date of Patent: *Dec. 15, 2009

(54) HYDRAULIC CONTROL APPARATUS FOR AN AUTOMATIC DUAL-CLUTCH TRANSMISSION

(75) Inventors: Martin Leibbrandt, Bedburg (DE); Reinhard Moehlmann, Köln (DE)

(73) Assignee: Getrag Ford Transmissions GmbH, Scarletallee (DE)

( * ) Notice: Subject to any disclaimer, the term of this patent is extended or adjusted under 35 U.S.C. 154(b) by 447 days.

This patent is subject to a terminal disclaimer.

(21) Appl. No.: 11/534,130

(22) Filed: Sep. 21, 2006

(65) Prior Publication Data

US 2007/0074944 A1 Apr. 5, 2007

(30) Foreign Application Priority Data

Sep. 22, 2005 (EP) .................................. 05108780

(51) Int. Cl.
*F16D 25/00* (2006.01)

(52) U.S. Cl. ................................................. 192/87.19
(58) Field of Classification Search ................ 192/3.58, 192/3.63, 87.13, 87.18, 87.19
See application file for complete search history.

(56) References Cited

FOREIGN PATENT DOCUMENTS

DE 101 34 115 1/2003

*Primary Examiner*—Dirk Wright
(74) *Attorney, Agent, or Firm*—Schlee IP International, P.C.; Alexander R. Schlee

(57) ABSTRACT

The invention relates to a hydraulic control device for an automatic dual-clutch transmission which has a first clutch and a second clutch, having a control valve unit which predefines at least one hydraulic parameter such as pressure and/or one volume flow. Regulating this parameter engages or disengage the clutches. An additional separating valve can is provided, and by means of a first switching valve to be operated by means of at least one further control signal the first clutch can be regardless of the switching position of the separating valve. The purpose is to provide enhanced operational safety against misoperation while at the same time secure availability of the clutches.

16 Claims, 1 Drawing Sheet

HYDRAULIC CONTROL APPARATUS FOR AN AUTOMATIC DUAL-CLUTCH TRANSMISSION

This application claims the priority of the European Patent Application EP05108780 having a filing date of Sep. 22, 2005, the entire content of which is herewith incorporated by reference.

BACKGROUND OF THE INVENTION

The invention relates to a hydraulic control device for an automatic dual-clutch transmission which has a first clutch and a second clutch.

Dual-clutch transmissions have been known for a relatively long time and are preferably used in motor vehicles. A dual-clutch transmission generally has a first partial transmission and a second partial transmission which are each assigned a group of gears. Here, the first clutch separates the first partial transmission from an engine of the motor vehicle, while the second clutch serves to separate the second partial transmission from, or connect the latter to, the engine.

As a result of the considerable mechanical expenditure in actuating two clutches and shifting the gears of both partial transmissions, dual-clutch transmissions are usually automatic, that is to say both the actuation of the clutches and the shifting of the gears is performed by means of associated auxiliary drives which are actuated by means of preferably one hydraulic control device.

There is often no provision in automatic dual-clutch transmissions for the driver of the motor vehicle to directly mechanically influence the transmission of torque of the dual-clutch transmission. In some dual-clutch transmissions, only a parking lock can be mechanically operated by the driver of the motor vehicle.

For safety reasons, the hydraulic control device should preferably be designed such that the torque flow through the dual-clutch transmission can always be reliably interrupted in the event of a fault. This can be provided by opening the clutches. For this purpose, the clutches are placed in an unpressurized state, as long as said clutches are hydraulically operated clutches which are open in the unpressurized state (normally open clutch).

A result of the above requirement is that a torque flow should also be interrupted when two individual faults which can have a direct effect on one another occur in succession.

In addition to the above described requirement regarding the safety of the dual-clutch transmission, it is also necessary to meet the requirement for the best possible availability of the motor vehicle in which the dual-clutch transmission is installed. The requirement of good availability is generally met when, in the event of an individual fault, at least one forward gear and one reverse gear are available in order to enable the vehicle to be moved in two directions.

The requirements regarding safety and availability are often not met by known control devices for dual-clutch transmissions. It is known for example from DE 101 34 115 A1 to actuate the first clutch (this correspondingly also applies to the second clutch) by means of a hydraulic path which consists of a first switching valve and a first control valve which is connected in series with the switching valve. The first switching valve, which can be operated by means of an electrical control signal, places the first clutch in an unpressurized state in a rest position, and when said first switching valve is in a position which it assumes when it has a current applied to it, it connects the main pressure line to the first control valve which is controlled by means of an electrical control signal.

If, for example, the first switching valve can no longer be switched out of its rest position, the first clutch can no longer be operated. If reverse driving is effected via said clutch, the motor vehicle is no longer available, according to the above requirement, in the event of one single fault (failure of the first switching valve).

On the other hand, the first clutch, as long as it requires an actuating pressure to be closed, can no longer be opened if both the switching valve can no longer be placed in the rest position and also the pressure or the volume can no longer be reduced sufficiently by the control valve. In this case, the first clutch remains closed and the torque flow in the dual-clutch transmission can no longer be separated.

The same also applies to the second clutch. The dual-clutch transmission has, for the second clutch, a second switching valve and a second control valve, the same relationships arising in a similar way to the first clutch.

SUMMARY OF THE INVENTION

The invention is therefore based on the object of providing a hydraulic control device for an automatic dual-clutch transmission which is of simple and cost-effective design and is as operationally safe and as available as possible.

The object on which the invention is based is achieved by means of the control device according to claim 1. Preferred embodiments can be gathered from the subclaims.

The control device of the invention according to claim 1 is distinguished in that an separating valve, in an isolating position, applies an additional control signal to the first switching valve and the second switching valve, so that the first switching valve, in a position $B_I$, and the second switching valve, in a position $B_{II}$, separate the first and second clutches from the control valve unit, it being possible for the first switching valve to be operated by means of at least one further control signal, the first switching valve assuming a position $A_I$, in which the first clutch is connected to the control valve unit, when said further control signal is applied, regardless of the switching position of the separating valve.

The first switching valve and the second switching valve are actuated redundantly by the separating valve. Here, the first switching valve can be actuated by the (conventional) control signal, by means of which the first switching valve is operated during normal operation of the control device, and/or by the additional control signal which originates from the separating valve. Even if the control signal, provided during normal operation, for the first switching valve fails, the first switching valve can be reliably switched into the position $B_I$ by the separating valve, preferably resulting in the first clutch being placed in an unpressurized state. It can therefore be ensured by means of the separating valve that the first clutch can still be opened even if it is unintentionally acted on with pressure or a volume flow as a result of a fault both in the control valve unit and in the (conventional) control signal.

The second switching valve is also actuated redundantly. It can be operated either by the (conventional) control signal or by the additional control signal which originates from the separating valve. If the additional control signal is applied to the second switching valve, the second clutch is preferably placed in an unpressurized state.

The first switching valve can be switched into the position A:, in which the first clutch is connected to the control valve unit, by the further control signal, by means of which the first switching valve can be actuated in addition to the control signal provided during normal operation and the additional control signal. Said capacity for actuation by the further control signal ensures that the first clutch can still be operated even in the event of a fault of the separating valve. This prevents the first clutch from failing as a result of one single fault, specifically of the separating valve. The first clutch should preferably be assigned to that partial transmission which comprises a reverse gear and at least one forward gear.

The term "control signal" is also to encompass hydraulic control pressures or control volumes, as long as hydraulically actuated valves are involved. This is preferably the case with the switching valves.

In one preferred embodiment, the second switching valve is assigned a signal element which, for normal operation, generates the control signal for the second switching valve and provides the further control signal, by means of which the first switching valve assumes the position $A_I$. The first switching valve can therefore be switched, by means of the signal element assigned to the second switching valve, into the position in which it connects the first clutch to the control valve unit. If the further control signal is applied to the first switching valve, said signal is preferably simultaneously applied to the second switching valve as well, the second switching valve then being switched into or held in the position $B_{II}$. The second clutch is placed/kept in an unpressurized state as a result.

The separating valve, in a normal position, can connect the first control valve to the first switching valve and, in the isolating position, can connect the second control valve to the first switching valve. This makes it possible, in the event of failure of the first control valve, to connect the second control valve to the first clutch by means of the separating valve and the first switching valve, in order to thus ensure the required availability, as long as the first clutch is assigned a reverse gear and at least one forward gear.

In one preferred exemplary embodiment, the separating valve can be operated by means of a control signal of an actuator which actuates a further valve unit of the hydraulic control device. This makes it possible to dispense with a signal element which is generally electrically operated and involves relatively high costs. A control signal which is already present in the hydraulic control device is therefore used for operating/actuating the separating valve. This should be a control signal which does not bring about any undesired side-effects when operating the separating valve.

The actuator is preferably designed as a dual-region regulator, the further valve unit being actuated, and it being possible to regulate said further valve unit within corresponding limits, in a first region. The separating valve can be operated in a second region.

As long as the dual-region regulator is in the first region, the separating valve does not switch. Only when the second region is reached can the separating valve be operated by means of the actuator. In the second region, the further valve unit preferably assumes an emergency position. Said emergency position is to be designed such that the valve unit can still perform its intended function at least to a sufficient extent.

The further valve unit can be embodied as a cooling oil regulator. Said cooling oil regulator can be a proportional regulator which, in the first region of the two-region regulator, regulates the cooling oil quantity and, in the second region, supplies the clutches with a minimum required quantity of cooling oil.

At least two signal lines can lead to the first switching valve, said signal lines being linked by means of two control faces on the first switching valve or by means of a changeover switch which is preferably in the form of a three-way ball valve. Here, the changeover switch is to be designed such that either the control signal of one signal line or the control signal of the other signal line is applied to the first switching valve. In the embodiment with two control faces, the control signals are added, so that, if the control signal is in the form of control pressure, the first switching valve is operated with a higher switching force.

In addition to the two signal lines, a third signal line preferably also leads to the first switching valve, said third signal line conducting the further control signal to the first switching valve. The further control signal, however, at least partially cancels out the influence of the other control signals on the first switching valve, so that the first switching valve always assumes the position $A_I$ when the further control signal is applied.

Two signal lines which are linked by means of two control faces or by means of a changeover switch, which is preferably in the form of a three-way ball valve, preferably also lead to the second switching valve.

In one preferred embodiment, the control valve unit provides at least one pressure and/or volume flow, which can be regulated, for actuating a gearshift system for engaging/disengaging gears in the dual-clutch transmission. The control valve unit therefore assumes not only the function of actuating the first and second clutches but also that of automatically engaging and disengaging the gears in the dual-clutch transmission.

The first switching valve can, in the position $A_I$, connect the first control valve to the first clutch and separate said first control valve from the gearshift system and can, in the position $B_I$, connect the first control valve to the gearshift system and separate said first control valve from the first clutch, while the second switching valve can, in a position $A_{II}$, connect the second control valve to the second clutch and separate said second control valve from the gearshift system and, in a position $B_{II}$, connect the second control valve to the gearshift system and separate said second control valve from the second clutch.

By means of said arrangement of the control valves and of the switching valves, the gearshift system for shifting the gears can be connected to both control valves by means of corresponding positions $B_I$, $B_{II}$. This makes it possible for both the first control valve and the second control valve to supply a regulated pressure or regulated volume flow for the gearshift system. Said exemplary embodiment therefore permits shifting of the gears regardless of which of the two control valves fails.

In addition, the exemplary embodiment has the advantage that the two clutches can be operated and the gears can be shifted by means of only two control valves. This allows the production costs for such a control device to be kept low, since control valves such as a control valve or a flow regulator are more expensive than switching valves.

A changeover switch can be provided between the first switching valve and also the second switching valve and the gearshift system, said changeover switch ensuring that the gearshift system is acted on either only by the pressure or volume flow of the first control valve or only by the pressure or volume flow of the second control valve. Said changeover switch serves to break the connection between the gearshift system and the control valve which is not (currently) provided for controlling the shift system or cannot assume control as a result of a fault. The control of the gearshift system is therefore not adversely affected by an undesired superposition of two control valves, of which one could potentially be defective.

The changeover switch is preferably embodied as a shuttle valve. Here, the shuttle valve, for example in the form of a three-way ball valve, has a first inlet, a second inlet and an outlet, the first inlet being connected to the first control valve and the second inlet being connected to the second control valve, The outlet of the changeover switch is connected to the gearshift system. The shuttle valve produces a connection between the outlet and that inlet which has the higher pressure applied to it, while simultaneously breaking the connection between the outlet and that inlet which has the lower pressure applied to it.

BRIEF DESCRIPTION OF THE DRAWINGS

The invention is explained in more detail on the basis of an exemplary embodiment illustrated in FIG. 1. Here.

DETAILED DESCRIPTION OF THE DRAWINGS

Figure 1:
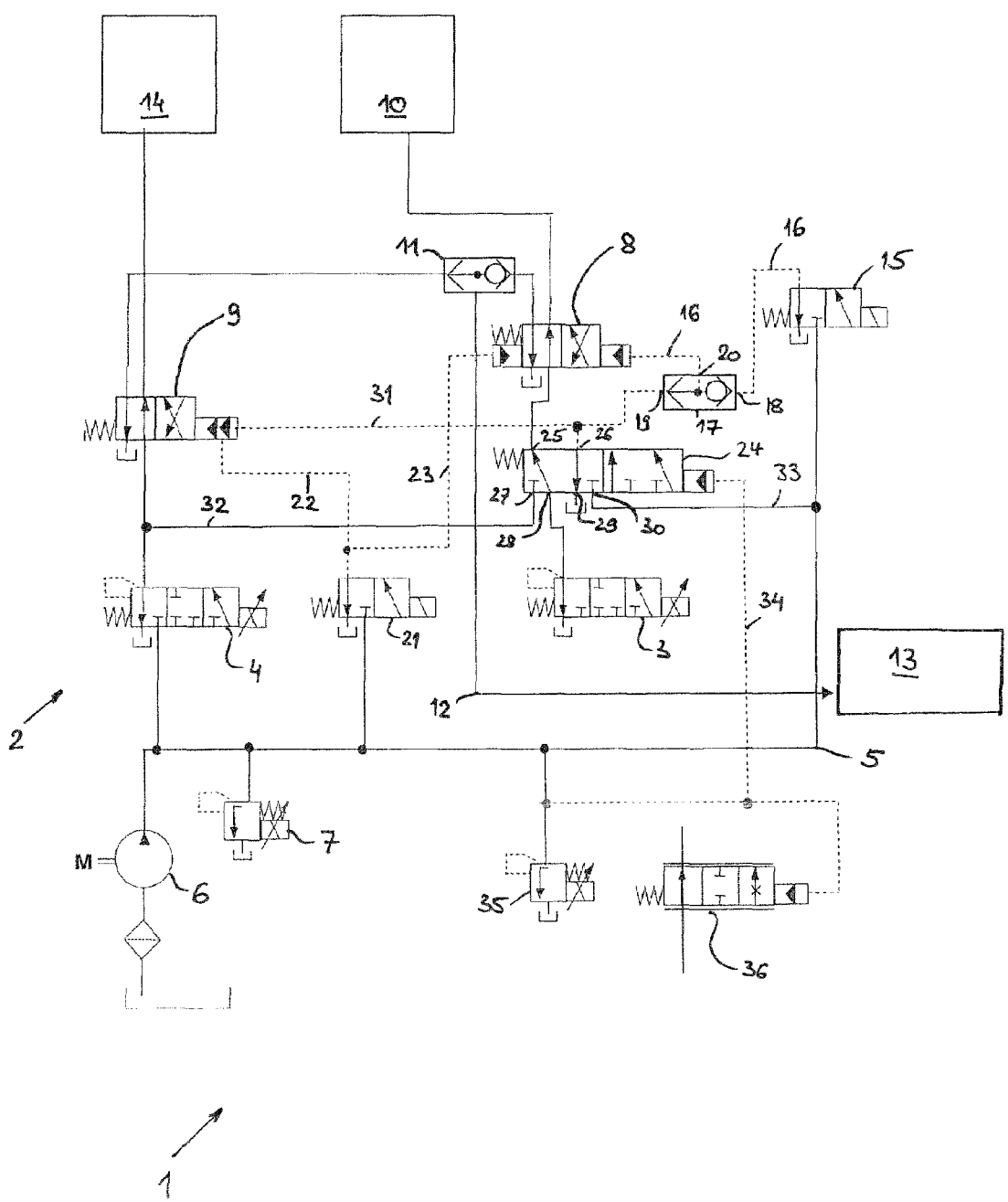
FIG. 1 shows a block circuit diagram of a preferred exemplary embodiment.

A control device, which is denoted in its entirety by 1, comprises a control valve unit 2 with a first pressure control valve or control valve 3 and a second control valve 4. The two control valves 3, 4 are connected, at their inlets, to a main pressure accumulation line 5. A pump 6 in combination with a main control valve 7 ensures the corresponding main pressure.

The first control valve 3 is assigned a first switching valve 8, and the second control valve 4 is assigned a second switching valve 9. The first control valve 3 can be connected by means of the first switching valve 8 to either the first clutch 10 or a changeover switch 11, which is embodied as a pressure changeover switch and is connected via a line 12 to a gearshift system 13 which is not illustrated in any more detail here. A regulated pressure of the second control valve 4 can be applied, by means of the second switching valve 9, to either the pressure changeover switch 11 or a second clutch 14.

The control device 1 can control a dual-clutch transmission having two separate clutches (cf. first clutch 10 and second clutch 14) and having a plurality of actuating members of the gearshift system, by means of which individual gears of the dual clutch transmission can be engaged or disengaged. Here, the dual-clutch transmission comprises a first partial transmission and a second partial transmission which are assigned to the first and second clutches 10, 14 respectively. If a pressure is applied to a clutch cylinder of a clutch, the clutch is closed, said clutch otherwise being held open by means of a spring force. In the closed state, the clutch transmits a torque between a drive unit and the associated partial transmission.

A signal element 15 is provided for actuating the first switching valve 8. The signal element 15 conducts a signal or a signal pressure to the first switching valve 8 via a signal line 16. The signal line 16 is interrupted by means of a changeover switch 17 which, like the changeover switch 11, is embodied as a pressure changeover switch. Here, the changeover switch 17 has two inlets 18, 19 and an outlet 20. If the signal element 15 applies a control pressure to the changeover switch 17 via the control line 16, said changeover switch 17 opens the connection between the signal element 15 and the first switching valve 8 as long as no pressure is applied to the inlet 19, so that the switching valve 8 is switched from a position $A_I$ (rest position in this case) illustrated here into a position $B_I$ (activated position in this case). In said position $B_I$, the first clutch 10 is placed in an unpressurized state, and the first control valve 3 is connected to the changeover switch 11.

A signal element 21 is provided for actuating the second switching valve 9, said signal element 21 conducting a signal or a signal pressure to the second switching valve 9 via a signal line 22. In addition, the signal element 21 is connected to the first switching valve 8 via a signal line 23. Here, the first switching valve 8 is designed such that it assumes the position $A_I$ (as illustrated in FIG. 1) if the main pressure accumulation line 5 is connected to the signal line 23 via the signal line 21, regardless of whether a control pressure is applied to the first switching valve 8 via the changeover switch 17.

The control device 1 additionally comprises an separating valve 24. The separating valve 24 is embodied as a hydraulically operated 6/2 directional switching valve having two outlets 25, 26 and four inlets 27, 28, 29, 30. In a normal position illustrated in FIG. 1, the separating valve 24 connects the first control valve 3 to the first switching valve 8 via the inlet 28 and the outlet 25. At the same time, in said normal position, said separating valve 24 places a signal line 31 in an unpressurized state via the outlet 26 and the inlet 29. In an isolating position of the separating valve 24, the second control valve 4 is connected to the first switching valve 8 via a line 32, the inlet 27 and the outlet 25, so that, in said isolating position, the first clutch 10 can be operated by the second control valve 4. At the same time, in the isolating position of the separating valve 24, the main pressure is applied to the signal line 31 via the line 33.

The hydraulically operated separating valve 24 obtains its control pressure via a signal line 34 from a cooling oil actuator 35. The cooling oil actuator 35 is embodied as a dual-region regulator. A cooling oil regulator 36 can be controlled in a first pressure region of the dual-region regulator 35, said cooling oil regulator 36 providing a certain cooling oil quantity to an outlet 37 of the cooling oil regulator. In a second region of the dual-region regulator 35, the cooling oil regulator 36 switches into an emergency position in which a limited but sufficiently great cooling oil quantity is ensured by means of an aperture.

The second switching valve 9, like the first switching valve, can also assume a first position $A_{II}$ (as illustrated in FIG. 1) and a second piston $B_{II}$. As can be clearly seen from FIG. 1, in the position $A_{II}$, the second switching valve 9 connects the second control valve 4 to the second clutch 14. In the position $B_{II}$, the second clutch 14 is placed in an unpressurized state, while the second control valve 4 is connected to the gearshift system 13 via the changeover switch 11 and the line 12.

In the following, the mode of operation of the hydraulic control device 1 is to be described on the basis of some possible instances of failure: for example, if the first control valve 3 no longer provides regulated pressure as a result of a fault, the first clutch can be connected to the second control valve 4 by means of the separating valve 24. Here, as described above, the separating valve 24 assumes the isolating position in which the main pressure is conveyed as a signal pressure to the switching valves 8, 9 via the signal line 31. This leads to both the first switching valve 8 and the second switching valve 9 being pressed into their respective positions $B_I$, $B_{II}$. In said positions $B_I$, $B_{II}$, both the clutches 10, 14, are placed in an unpressurized state. In order to nonetheless be able to operate the first clutch 10 by means of the second control valve 4, the signal element 21 can apply the main pressure to the first switching valve 8 via the signal line 25, resulting in said first switching valve 8 assuming the position $A_I$ and connecting the outlet 25 of the separating valve 24 to the first clutch 10. The second control valve 4 is thus connected to the clutch 10. The first clutch 10 is expediently assigned to that partial transmission of the dual-clutch transmission which, in addition to some forward gears, also comprises a reverse gear of a motor vehicle. That clutch in the dual-clutch transmission with which the motor vehicle can be moved backwards and forwards can thus be operated both by means of the first control valve 2 and by means of the second control valve 4.

The clutches 10, 14 can be reliably placed in an unpressurized state by the separating valve 24 even if, as a result of a fault, both the signal element 15 and the signal element 21 fail and the pressure of one of the control valves 3, 4 cannot be reduced. The separating valve 24 can therefore reliably interrupt a torque flow through the dual-clutch transmission. If the separating valve 24 switches into the isolating position as a result of a fault, the signal element 21 in conjunction with the second switching valve 8 ensures hat the first clutch can be operated by means of the second control valve. Availability of the motor vehicle is therefore ensured even if the separating valve fails, regardless of which position it is in.

The switching valves 8, 9 are designed such that, by applying the respective control pressure to the control faces, a force is generated which is of such a magnitude that it is virtually impossible for the valves to become jammed.

Only the switching valves 8, 9, the control valves 3, 4 and the actuator 35 and the main flow regulator 7 are valves which are actuated by electrical current and involve relatively high costs. All the other valves are operated by a hydraulic control pressure. The invention therefore makes it possible to obtain a cost-effective control device which corresponds to stringent safety and availability requirements.

LIST OF REFERENCE SYMBOLS

1 Control device
2 Control valve unit
3 First control valve
4 Second control valve
5 Main pressure collecting line
6 Pump
7 Main control valve
8 First switching valve
9 Second switching valve
10 First clutch
11 Changeover switch
12 Line
13 Gearshift system
14 Second clutch
15 Signal element
16 Signal line
17 Changeover switch
18 Inlet
19 Inlet
20 Outlet
21 Signal element
22 Signal line
23 Signal line
24 Separating valve
25 Outlet
26 Outlet
27 Inlet
28 Inlet
29 Inlet
30 Inlet
31 Signal line
32 Line
33 Line
34 Line
35 Cooling oil actuator
36 Cooling oil regulator

The invention claimed is:

1. Hydraulic control device for an automatic dual-clutch transmission having a first clutch and a second clutch, said hydraulic control device comprising:
a control valve unit setting at least one hydraulic parameter from the group consisting of pressure and volume flow for actuating the first and second clutches, said control valve unit comprising:
a first control valve
a second control valve, and
a switching valve unit,
wherein by means of the control valve unit the clutches can be separated from the control valve unit;
the switching valve unit comprising:
a first switching valve, and
a second switching valve,
wherein the first and second switching valve can both be operated by means of a control signal;
a separating valve, that in a separating position, provides an additional control signal to the first switching valve and the second switching valve, so that the first switching valve, in a position $B_I$, and the second switching valve, in a position $B_{II}$, separate the first and second clutches from the control valve unit,
wherein at least one further control signal can be directed to the first switching valve causing it to assume a position $A_I$ irrespective of the position of the separating valve, in which position $A_I$ the first clutch is connected to and can be operated by the control valve unit.

2. Control device according to claim 1, wherein the hydraulic parameter is a pressure and the separation from the regulating valve takes place by switching the clutches into an unpressurized stage.

3. Control device according to claim 1, wherein the hydraulic parameter is a volume flow and the separation from the regulating valve takes place by cutting the volume flow off.

4. Control device according to claim 1, wherein the first switching valve, in the position $B_I$, places the first clutch in a unpressurized state, and in that the second switching valve, in the position $B_{II}$, places the second clutch in an unpressurized state.

5. Control device according to claim 1, wherein the second switching valve is assigned a signal element which generates the control signal for the second switching valve and provides the further control signal, by means of which the first switching valve assumes the position $A_I$.

6. Control device according to claim 1, wherein the separating valve, in a normal position, connects the first control valve to the first switching valve and, in the isolating position, connects the second control valve to the first switching valve.

7. Control device according to claim 1, wherein the separating valve can be operated by means of a control signal of an actuator which actuates a further valve unit.

8. Control device according to claim 7, wherein the actuator is designed as a dual-region regulator, the further valve unit being actuated in a first region, and it being possible for the separating valve to be operated in a second region.

9. Control device according to claim 8, wherein, in the second region, the further valve unit assumes an emergency position.

10. Control device according to claim 7, wherein the further valve unit serves to regulate cooling oil.

11. Control device according to claim 1, wherein at least two signal lines lead to the first switching valve, said signal lines being linked by means of two control faces or by means of a changeover switch which is preferably in the form of a three-way ball valve.

12. Control device according to claim 1, wherein at least two signal lines lead to the second switching valve, said signal lines being linked by means of two control faces or by means of a changeover switch which is preferably in the form of a three-way ball valve.

13. Control device according to claim 1, wherein the control valve unit provides at least one hydraulic parameter from the group consisting of pressure and volume flow, which can be regulated, for actuating a gearshift system for engaging/disengaging gears in the dual-clutch transmission.

14. Control device according to claim 13, wherein the first switching valve, in the position $A_I$, connects the first control valve to the first clutch and separates said first control valve from the gearshift system and, in the position $B_I$, connects the first control valve to the gearshift system and separates said first control valve from the first clutch, and the second switching valve, in a position $A_{II}$, connects the second control valve to the second clutch and separates said second control valve from the gearshift system and, in a position $B_{II}$, connects the second control valve to the gearshift system and separates said second control valve from the second clutch.

15. Control device according to claim 11, wherein a changeover switch is provided between the first switching valve and also the second switching valve and the gearshift system, said changeover switch ensuring that the gearshift system is acted on either by the pressure or volume flow of the first control valve or by the pressure or volume flow of the second control valve.

16. Control device according to claim 13, wherein the changeover switch is preferably embodied as a 3-way ball valve.

* * * * *

UNITED STATES PATENT AND TRADEMARK OFFICE
CERTIFICATE OF CORRECTION

PATENT NO. : 7,631,740 B2
APPLICATION NO. : 11/534130
DATED : December 15, 2009
INVENTOR(S) : Martin Leibbrandt and Reinhard Moehlmann It is certified that error appears in the above-identified patent and that said Letters Patent is hereby corrected as shown below:

Column 2, line 62 - A: should be $A_I$
Reads: A:, in which the first clutch is connected to the control valve
Should read: $A_I$, in which the first clutch is connected to the control valve Column 5, line 3 - incorrect punctuation
Reads: valve, The outlet of the changeover switch is connected to the
Should read: valve. The outlet of the changeover switch is connected to the Signed and Sealed this Twenty-third Day of March, 2010

David J. Kappos
*Director of the United States Patent and Trademark Office*